L. A. HAWKINS.
ROTARY CONVERTER FOR DIRECT CURRENTS.
APPLICATION FILED MAR. 28, 1908.

927,142.

Patented July 6, 1909.

Witnesses
J. Ellis Glen
J. Earl Ryan

Inventor:
Laurence A. Hawkins
by Albert G. Davis
Atty.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

ROTARY CONVERTER FOR DIRECT CURRENTS.

No. 927,142.          Specification of Letters Patent.          Patented July 6, 1909.

Application filed March 28, 1908. Serial No. 423,813.

*To all whom it may concern:*

Be it known that I, LAURENCE A. HAWKINS, a citizen of the United States, residing at Schenectady, county of Schenectady, State of New York, have invented certain new and useful Improvements in Rotary Converters for Direct Currents, of which the following is a specification.

My invention relates to rotary converters for transforming direct-current from one voltage to another, as, for instance, for deriving a constant direct-current voltage from a supply-circuit, the voltage of which varies, or for deriving a direct-current voltage, variable at will, from a constant potential direct-current circuit. For such purposes, it has been customary, heretofore, to employ a motor-generator set. By my invention I am enabled to substitute for the two machines of a motor-generator set a single machine, thereby decreasing the first cost, increasing the efficiency, and improving the regulation.

My invention consists in providing a machine with a commutator and two sets of brushes displaced from each other approximately ninety electrical degrees, connections for supplying current to and leading current from the two sets of brushes, respectively, a plurality of different field circuits, and sets of field coils in said circuits displaced circumferentially from each other, whereby a relative variation of current in said circuits shifts the field magnetization circumferentially with respect to the field magnets and the brushes so as to vary the relative amount of the voltage induced in the armature between the two sets of brushes. Since the voltage at the brushes to which current is supplied is fixed by the voltage of the primary or supply circuit, varying the voltage of the other set of brushes, with respect to the first set, varies the voltage on the load-circuit with respect to the voltage on the supply circuit. This variation may either be automatic, as, for instance, for the purpose of obtaining a constant voltage on the load-circuit, regardless of voltage fluctuations on the supply circuit, or the regulation may be manual to obtain from a constant potential supply-circuit a voltage of any desired amount on the load-circuit.

My invention will best be understood by reference to the accompanying drawing, in which—

Figure 1:
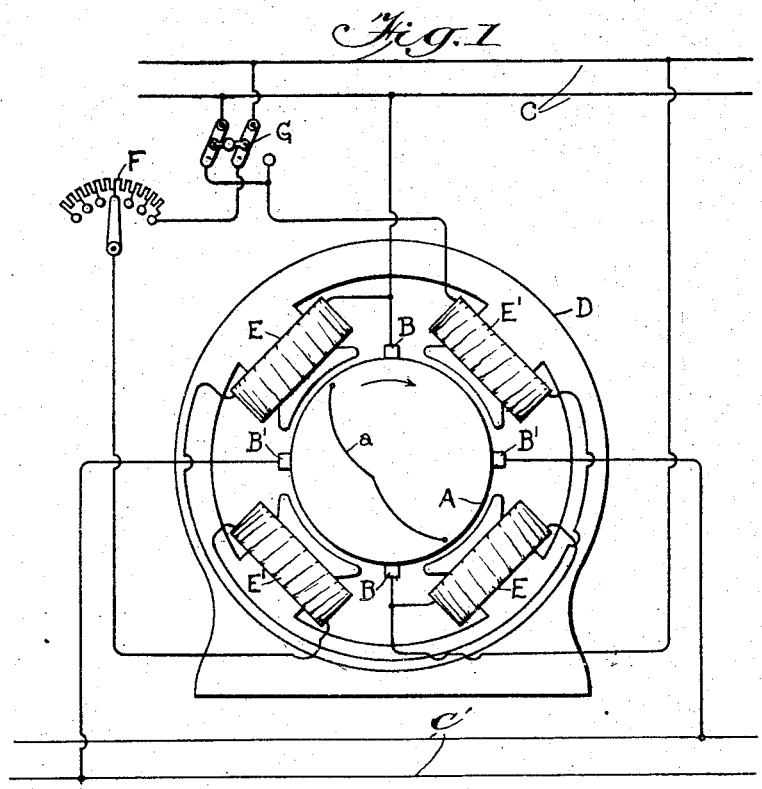
Figure 2:
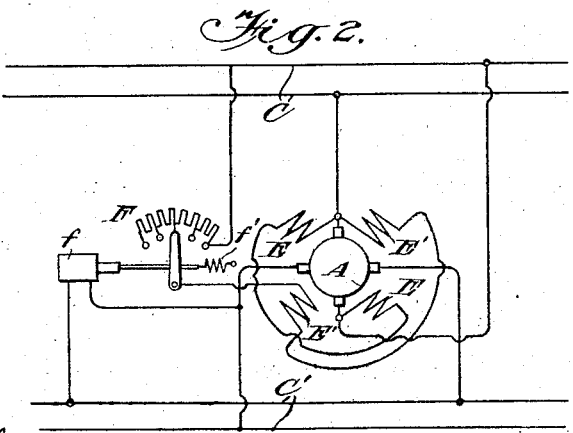

Figure 1 shows diagrammatically a direct-current variable-voltage rotary converter arranged in accordance with my invention for manual control, and Fig. 2 shows the machine provided with an automatic regulator.

In the drawing, A represents the armature, which is provided with two sets of commutator brushes, one set B B connected to the supply-circuit C, and the other set B' B' connected to the load-circuit C'. The two sets of brushes are displaced from each other ninety electrical degrees, the armature in the machine shown in the drawing having a bi-polar winding, as indicated both by the diametrically opposite positions of the two brushes connected to the same circuit, and also by the span of the armature coil $a$, which indicates diagrammatically the pitch of the armature winding. The field magnet D is provided with two sets of poles, one set carrying the coils E E, and the other set carrying the coils E' E'. These two sets of poles are displaced from each other by ninety electrical degrees, and the poles of each set, as, for instance, the two poles carrying the coils E E, are of opposite polarity. The two left-hand poles form in effect a single pole, as far as the brushes B B are concerned, the right-hand poles forming in effect the other pole for these brushes; while for the brushes B' B' the two upper polar projections form in effect a single pole, and the lower projections, the other. The coils E E are connected in shunt to the brushes B B, and consequently are traversed by currents of constant strength, and maintain the poles on which they are placed at substantially constant magnetic strength. The coils E' E' are connected to the supply circuit C through a rheostat F and a reversing switch G. In Fig. 1, the rheostat is indicated as manually operated. In Fig. 2 it is represented as controlled by a simple and well known form of voltage regulator comprising a solenoid $f$ connected to the load circuit C' working against the spring $f'$.

The operation of the machine will be understood by the following considerations: Suppose that the coils E' are traversed by a current of such strength and such a direction that all four polar projections on the field magnet are of the same strength, and that the two right-hand projections are of one polarity, and the two other projections of the other polarity. With respect to the brushes B B, the conditions are then the same as in an ordinary bi-polar motor. The line of effective field magnetization is at right-angles to the line brushes B B and parallel to the brushes B' B'. Consequently, the latter brushes are at points of zero induced voltage. Now, assume the circuit of coils E' E' to be open. The poles on which the coils E are placed are then alone energized, and the effect on the field magnetization is as though it were shifted circumferentially forty-five electrical degrees. The same voltage is now induced between the brushes B' B', that is induced between the brushes B B, so that the voltage supplied to the load-circuit is equal to the voltage taken from the supply circuit. For any intermediate current-strength in the coils E' E', the voltage at the brushes B' B' is intermediate zero and the voltage of the supply-circuit, while the effect on the field magnetization is to shift its line of effective magnetization as the current in coils E' E' is varied. If, after reducing the current in the coils E' E' to zero, these coils are reversed, and a gradually increasing current is introduced into them, the voltage at the brushes B' B' becomes greater than the voltage at the brushes B B, so that the voltage on the load-circuit is greater than that of the supply-circuit. The two upper polar projections are now of the same polarity, so that the line of effective field magnetization makes an angle of more than forty-five degrees with the horizontal. It is not, of course, possible to carry this reverse-current up to an amount equal to that in the coils E E, since, otherwise, the counter-electro-motive force between the brushes B B would be zero, and the machine would act as a short-circuit on the supply-circuit. Furthermore, before this point was reached, the speed of the machine would have increased far beyond safe limits; for, unless the current in the coils E E is also varied, when the relative strength of the currents in the coils E, E, and E' E' is varied to control the voltage ratio of the machine, the speed does not remain constant, but increases with increase of voltage on the load-circuit. In other words, the speed is inversely proportional to the component of the field magnetization which is effective for inducing current between the brushes B B.

If the rheostat F is an automatic regulator as in Fig. 2, the voltage on the circuit C' may be held constant, regardless of voltage-fluctuations on the circuit C; or if the rheostat F is manually controlled, any desired voltage may be obtained on the load-circuit C'.

The direction of rotation of the armature should be as indicated by the arrow, in order to obtain best conditions for commutation. With the armature rotating in this direction, the brushes B B, to which current is supplied, are near the trailing pole-tips of the poles of constant strength carrying coils E E; so that by properly positioning the brushes the commutation conditions are the same as those in an ordinary motor, with a backward shift of the brushes, while the brushes B' B' are near the leading tips of the poles of constant strength, so that the conditions are the same as those in a generator with a forward shift of the brushes.

In a machine of the type illustrated, the regulation, except for the ohmic-drop in the armature, is perfect, since the load current flowing between the brushes B' B', in so far as it demagnetizes the field, increases the speed of the machine by weakening the counter-electromotive force between the brushes B B, so that the voltage is maintained constant. Furthermore, the magnetic reactions of the motor and generator currents in the armature tend to neutralize each other, as in the ordinary rotary converter, and the ohmic loss of the armature is smaller than would be the case in either a motor or generator with the same amount of copper in the armature and carrying the same load.

I do not desire to limit myself to the construction and arrangement of parts nor to the connections of field coils here shown, but aim in the appended claims to cover all modifications which are within the scope of my invention.

What I claim as new and desire to secure by Letters Patent of the United States, is:

1. A variable-voltage rotary converter for direct-currents, comprising an armature provided with a commutator, two sets of commutator brushes displaced from each other circumferentially, connections for supplying current to and leading current from the two sets of brushes respectively, and a plurality of different field circuits, and sets of field coils in said circuits displaced circumferentially from each other, whereby a relative variation of current in said circuits shifts the field magnetization circumferentially with respect to the field magnets and the brushes so as to vary the relative amounts of the voltages induced in the armature between the two sets of brushes.

2. A variable-voltage rotary converter for direct-currents, comprising an armature provided with a commutator, two sets of commutator brushes displaced from each other approximately ninety electrical degrees, connections for supplying current to and leading current from the two sets of brushes respectively, a field-magnet, and a plurality of different field circuits, and sets of field coils in said circuits displaced circumferentially from each other, whereby a relative variation of current in said circuits shifts the field magnetization circumferentially with respect to the field magnets and the brushes so as to shift the magnetization circumferentially with respect to the field magnet and therefore with respect to the brushes.

3. A variable-voltage rotary converter for direct currents, comprising an armature provided with a commutator, two sets of commutator brushes displaced from each other approximately ninety electrical degrees, connections for supplying current to and leading current from the two sets of brushes respectively, a field magnet, and a plurality of different field circuits, and sets of field coils in said circuits displaced circumferentially from each other, whereby a relative variation of current in said circuits varies the relative strengths of the components of the field magnetization that are effective for inducing voltages in the armature between the two sets of brushes respectively.

4. A variable-voltage rotary converter for direct-currents, comprising an armature provided with a commutator, two sets of commutator brushes displaced from each other approximately ninety electrical degrees, connections for supplying current to and leading current from the two sets of brushes respectively, a field-magnet having two sets of poles displaced from each other approximately ninety electrical degrees and provided with field coils connected to make alternate poles of each set of opposite polarity, and separate circuits including the field coils of said two sets of poles respectively, whereby a relative variation of current in said circuit varies the relative magnetic strengths of two sets of poles.

5. A variable-voltage rotary converter for direct-currents, comprising an armature provided with a commutator, two sets of commutator brushes displaced from each other approximately ninety electrical degrees, connections for supplying current to and leading current from the two sets of brushes respectively, a field-magnet having two sets of poles displaced from each other approximately ninety electrical degrees having field coils connected to make alternate poles of each set of opposite polarity, a field circuit in which the current is substantially constant including the field coils of one set of poles, and a separate field circuit in which the current is variable, including the field coils of the other set of poles.

6. A variable-voltage rotary converter for direct-currents, comprising an armature provided with a commutator, two sets of commutator brushes displaced from each other approximately ninety electrical degrees, connections for supplying current to and leading current from the two sets of brushes respectively, a field-magnet having two sets of poles displaced from each other approximately ninety electrical degrees and provided with field coils connected to make alternate poles of each set of opposite polarity, a field circuit in which the current is substantially constant including the field coils of one set of poles, and a separate field circuit in which the current is variable, including the field coils of the other set of poles, the commutator brushes to which current is supplied being on the trailing side of the poles of which the field coils are in the constant current circuit and the brushes from which current is taken being on the leading side of said poles.

In witness whereof, I have hereunto set my hand this 27th day of March, 1908.

LAURENCE A. HAWKINS.

Witnesses:
HELEN ORFORD,
FRANK J. DORE.